(12) United States Patent
Siebigteroth

(10) Patent No.: US 12,434,420 B2
(45) Date of Patent: Oct. 7, 2025

(54) PLANT FOR PRODUCING A COEXTRUDED MULTI-LAYER FILM, APPARATUS FOR COEXTRUDING A MULTILAYERED COEXTRUSION COMPOSITE AND METHOD FOR COEXTRUDING AND ALSO METHOD FOR OPERATING A PLANT AND/OR APPARATUS FOR THIS PURPOSE

(71) Applicant: REIFENHÄUSER GMBH & CO. KG MASCHINENFABRIK, Troisdorf (DE)

(72) Inventor: Peter Siebigteroth, Eitorf (DE)

(73) Assignee: REIFENHÄUSER GMBH & CO. KG MASCHINENFABRIK, Troisdorf (DE)

( * ) Notice: Subject to any disclaimer, the term of this patent is extended or adjusted under 35 U.S.C. 154(b) by 124 days.

(21) Appl. No.: 17/769,174

(22) PCT Filed: Oct. 15, 2020

(86) PCT No.: PCT/DE2020/200088
§ 371 (c)(1),
(2) Date: Apr. 14, 2022

(87) PCT Pub. No.: WO2021/073698
PCT Pub. Date: Apr. 22, 2021

(65) Prior Publication Data
US 2023/0347569 A1 Nov. 2, 2023

(30) Foreign Application Priority Data
Oct. 15, 2019 (DE) .................. 10 2019 127 777.9

(51) Int. Cl.
*B29C 48/92* (2019.01)
*B29C 48/00* (2019.01)
(Continued)

(52) U.S. Cl.
CPC .......... *B29C 48/92* (2019.02); *B29C 48/0019* (2019.02); *B29C 48/08* (2019.02);
(Continued)

(58) Field of Classification Search
CPC ................ B29C 48/2528; B29C 48/31; B29C 2948/2528; B29C 2948/92647; B29C 48/2556; B29C 2948/92428
See application file for complete search history.

(56) References Cited

U.S. PATENT DOCUMENTS 3,940,221 A * 2/1976 Nissel ..................... B29C 48/31
425/141
5,770,129 A * 6/1998 Monti ..................... B29C 48/92
425/141
(Continued)

FOREIGN PATENT DOCUMENTS

DE 19802646 C1 2/2000
DE 10020202 C1 10/2001
(Continued)

OTHER PUBLICATIONS

International Search Report and Written Opinion for corresponding PCT patent application No. PCT/DE2020/200088 dated Jun. 24, 2021.
(Continued)

*Primary Examiner* — Seyed Masoud Malekzadeh
(74) *Attorney, Agent, or Firm* — Tarolli, Sundheim, Covell &Tummino LLP

(57) ABSTRACT

The invention relates to a plant for producing a coextruded multilayer film with at least one extruder device for providing material melts of thermoplastic materials, with a device comprising a coextrusion adapter and a nozzle part for coextruding a multilayer coextrusion composite of intercon-
(Continued)

nected individual layers, wherein the coextrusion adapter has a central channel for producing a central layer of the coextrusion composite, at least one coextrusion channel for producing at least one further layer of the coextrusion composite interacting with the central layer, a plurality of displaceable adjusting elements for adjusting layer thicknesses and/or layer thickness profiles of individual layers of the coextrusion composite, and adjusting devices for actuating the adjusting elements, having a drive unit for driving the adjusting devices, having a measuring device for measuring layer thicknesses and/or layer thickness profiles of individual layers of the multilayer coextrusion composite, the measuring device being set up to measure the individual layer thicknesses and/or the individual layer profiles downstream of the nozzle part, and having a system controller for controlling the system, wherein the system controller comprises a controller unit which is set up so that relative positions of adjusting elements can be manipulated automatically, preferably iteratively, by means of the drive unit as a function of layer thicknesses and/or layer thickness profiles measured on the multilayer film already leaving the nozzle part.

5 Claims, 3 Drawing Sheets

(51) Int. Cl.
    *B29C 48/08*     (2019.01)
    *B29C 48/21*     (2019.01)
    *B29C 48/25*     (2019.01)
    *B29C 48/31*     (2019.01)

(52) U.S. Cl.
    CPC .......... *B29C 48/21* (2019.02); *B29C 48/2528* (2019.02); *B29C 48/31* (2019.02); *B29C 2948/92152* (2019.02); *B29C 2948/92428* (2019.02); *B29C 2948/92438* (2019.02); *B29C 2948/92647* (2019.02)

(56) References Cited

U.S. PATENT DOCUMENTS

| | | | | |
|---|---|---|---|---|
| 6,099,290 | A * | 8/2000 | Gross | B29C 48/92 425/465 |
| 6,821,609 | B2 * | 11/2004 | Mende | B29C 48/307 428/188 |
| 7,101,454 | B2 * | 9/2006 | Sinsel | B05D 1/265 156/244.11 |
| 7,384,254 | B2 * | 6/2008 | Rubhausen | B29C 48/307 425/133.5 |
| 9,216,535 | B2 * | 12/2015 | Trice | B29C 48/07 |
| 9,694,530 | B2 * | 7/2017 | Truscott | B29C 48/92 |
| 9,808,980 | B2 * | 11/2017 | Truscott | B29C 48/16 |
| 12,030,223 | B2 * | 7/2024 | Fukuzawa | B29B 7/582 |
| 2002/0197449 | A1 * | 12/2002 | Mende | B29C 48/705 264/177.1 |
| 2006/0040009 | A1 * | 2/2006 | Rubhausen | B29C 48/307 425/131.1 |
| 2012/0313274 | A1 * | 12/2012 | Loukusa | B29C 48/31 425/141 |
| 2012/0313275 | A1 * | 12/2012 | Trice | B29C 48/07 264/167 |
| 2015/0104535 | A1 * | 4/2015 | Truscott | B29C 48/307 425/376.1 |
| 2017/0259483 | A1 * | 9/2017 | Kaun | B29C 48/49 |

FOREIGN PATENT DOCUMENTS

| | | |
|---|---|---|
| EP | 0418681 A1 | 3/1991 |
| JP | H08112852 A | 5/1996 |
| JP | H09225995 A | 9/1997 |

OTHER PUBLICATIONS

CN Office Action for corresponding CN Patent Application No. 202080086912.9, dated Mar. 29, 2024, 18 pages.

* cited by examiner

PLANT FOR PRODUCING A COEXTRUDED MULTI-LAYER FILM, APPARATUS FOR COEXTRUDING A MULTILAYERED COEXTRUSION COMPOSITE AND METHOD FOR COEXTRUDING AND ALSO METHOD FOR OPERATING A PLANT AND/OR APPARATUS FOR THIS PURPOSE

RELATED APPLICATIONS

The present invention is a U.S. National Stage under 35 USC 371 patent application, claiming priority to Serial No. PCT/DE2020/200088, filed on Oct. 15, 2020; which claims priority from German Patent Application No. 10 2019 127 777.9 filed on Oct. 15, 2019; the entireties of both are hereby incorporated herein by reference.

The invention relates to a plant for producing a coextruded multilayer film with at least one extruder device for providing material melts of thermoplastic materials, with a device comprising a coextrusion adapter and a die part for coextruding a multilayer coextrusion composite of interconnected individual layers, wherein the coextrusion adapter comprises a central channel for producing a central layer of the coextrusion composite, at least one coextrusion channel for producing at least one further layer of the coextrusion composite interacting with the central layer, a plurality of displaceable adjusting elements for adjusting layer thicknesses and/or layer thickness profiles at individual layers of the coextrusion composite, as well as adjusting devices for actuating the adjusting elements, with a drive unit for driving the adjusting devices, and with a measuring device for measuring layer thicknesses and/or layer thickness profiles at individual layers of the multilayer coextrusion composite, and with a system controller for controlling the system.

The invention also relates to a plant for producing a coextruded multilayer film with at least one extruder device for providing material melts of thermoplastic materials, with a device comprising a coextrusion adapter and a die part for coextruding a multilayer coextruded composite of interconnected individual layers, wherein the coextrusion adapter comprises a central channel for producing a central layer of the coextrusion composite, at least one coextrusion channel for producing at least one further layer of the coextrusion composite interacting with the central layer, a plurality of displaceable adjusting elements for adjusting layer thicknesses and/or layer profiles on individual layers of the coextrusion composite, and adjusting devices for actuating the adjusting elements, having a drive unit for driving the adjusting devices, a measuring device for measuring layer thicknesses and/or layer profiles on individual layers of the multilayer coextrusion composite, and having a system controller for controlling the system.

The invention relates to an apparatus for coextruding a multilayer coextrusion composite of interconnected individual layers of thermoplastic materials, in particular a coextruded multilayer film, having a coextrusion adapter which has a central channel for producing a central layer of the coextrusion composite, at least one coextrusion channel for producing at least one layer of the coextrusion composite which interacts with the central layer, a plurality of displaceable adjusting elements for adjusting layer thicknesses or layer thickness profiles at the individual layers of the coextrusion composite, and adjusting devices for actuating the adjusting elements, and with a nozzle part through which the multilayer coextrusion composite is discharged.

The invention further relates to a method for coextruding a multilayer coextrusion composite for a multilayer film.

The invention further relates to a method for operating a plant for producing a coextruded multilayer film and/or an apparatus for coextruding a multilayer coextrusion composite.

It is known from the prior art to manipulate cross-sections of material melt channels by manually driven adjusting elements of a coextrusion adapter in order to be able to produce different single layer thicknesses or single layer profiles of single layers of a multilayer coextrusion composite.

For example, a coextrusion adapter for an extrusion line is known from EP 1 621 320 A1, which is characterized by a central channel and several coextrusion channels, whereby a plurality of control elements are provided in the coextrusion adapter, which can be controlled from outside by means of manually actuated control elements in such a way that cross-sectional manipulation of channels of the coextrusion adapter can be achieved with these control elements.

Furthermore, a method for controlling individual layer thicknesses of several layers of a multilayer plastic web to be produced by coextrusion is known from DE 42 03 755 A1, in which individual melt streams guided through channels are combined within a coextrusion adapter of a coextrusion die to form a strand of individual layers, and in which the respective total layer thickness of the individual layers is determined before they emerge from a nozzle part of the coextrusion die, and in which the measured data determined in this way are compared with setpoint values, the result being used, in the event of a deviation between setpoint and actual value, to change a total channel cross-section of one of the channels for the individual melt streams in order to produce the layers.

Disadvantages of the prior art are in particular the insufficient and usually also tedious adjustment possibilities of a layer thickness or a layer thickness profile at individual layers at a multilayer coextrusion composite during the extrusion of the multilayer coextrusion composite, in particular due to temperatures prevailing directly at a coextrusion adapter.

The invention is based on the task of further developing the generic prior art for producing multilayer films and, in particular, overcoming known disadvantages.

According to a first aspect of the invention, the present problem is solved by an apparatus for producing a coextruded multilayer film, comprising at least one extruder device for providing material melts of thermoplastic materials, a device comprising a coextrusion adapter and a nozzle part for coextruding a multilayer coextruded composite of interconnected individual layers, the coextrusion adapter having a central channel for producing a central layer of the coextrusion composite, at least one coextrusion channel for producing at least one further layer of the coextrusion composite interacting with the central layer, a plurality of displaceable adjusting elements for adjusting layer thicknesses and/or layer thickness profiles on individual layers of the coextrusion composite, and adjusting devices for actuating the adjusting elements, having a drive unit for driving the adjusting devices, a measuring device for measuring layer thicknesses and/or layer thickness profiles at individual layers of the multilayer coextrusion composite, the measuring device being set up to measure the layer thicknesses and/or the layer thickness profiles downstream of the nozzle part, and having a system controller for controlling the system, wherein the system controller comprises a controller unit which is set up so that relative positions of adjusting elements can be automatically, preferably iteratively, maneuvered by means of the drive unit as a function of layer thicknesses and/or layer thickness profiles measured at the multilayer film already leaving the nozzle part.

It has been recognized that it is advantageous, in particular, to measure layer thicknesses and/or layer thickness profiles of an extruded multi-layer coextruded composite or of a coextruded multilayer film only downstream of a nozzle part of a coextrusion die or the like, since there the layer material has already cooled down significantly compared to a still plasticized layer melt in the nozzle part, so that the measurement data obtained are not falsified or are only falsified to a negligible extent by shrinkage or the like.

As a result, the adjustment elements can also be set more precisely as a function of these more precisely determined measurement data, so that layer thicknesses or layer thickness profiles can be generated more accurately.

In particular, this allows an advantageous inline adjustment between the setting elements and the measurement data.

As a result, the present system can be operated much more effectively.

First of all, it should be pointed out that in the context of the present patent application, indefinite articles and indefinite numerals such as "one . . . ", "two . . . " etc. are generally to be understood as indicating a minimum, i.e. as "at least one . . . ", "at least two . . . " etc., unless it is clear from the context or the specific text of a particular passage that only "exactly one . . . ", "exactly two . . . " etc. are intended.

At this point it should be mentioned that in the context of the present patent application the expression "in particular" is always to be understood as indicating an optional, preferred characteristic. The expression is not to be understood in the sense of "namely".

The term "layer thickness" describes in the present case that an individual layer or combinations of such individual layers, viewed over their overall widths, i.e. viewed transversely to their longitudinal extension in the machine direction, have a constant layer thickness.

Deviating from this, the term "layer thickness profile" describes that a single layer or combinations of such single layers, viewed over their total widths, i.e. transverse to their longitudinal extension in the machine direction, have a profiled layer thickness or layer thickness profile. This is achieved in particular by a large number of adjusting elements per coextrusion channel, which, viewed over the channel width, are arranged next to one another and can preferably be individually actuated.

The present drive unit can be designed in a wide variety of ways, preferably with actuators for driving the adjusting devices, the term "actuator" being understood to mean a driving device which, in the simplest case, can convert electrical signals into mechanical movements or bring about changes in physical variables, such as pressure, temperature or the like.

The drive unit can, for example, comprise individual drives, piezo actuators, linear cylinders, pneumatic systems or the like. Further, an alternative drive unit may cumulatively or alternatively include a manipulator or articulated arm robot.

In the sense of the invention, the term "controller unit" describes a device which is set up to control or regulate an operation of the system as a function of data or data links of individual system components, wherein the data may be present as electronic or digital data sets or the like, whether online, calculated, read in and/or stored.

Furthermore, the term "coextrusion adapter" describes, in the sense of the invention, a device by means of which, as a rule, different material melts from different extruders are combined as a multilayer material strand, which is subsequently fed to a nozzle part or an extrusion die. By means of the coextrusion adapter, an overall profile of profiled individual layers can preferably be created in adapter areas of the merging of the individual material melts by adaptation or change of one or more melt channel profiles. After flowing through the nozzle part or the extrusion die and after exiting an extrusion die gap of the nozzle part, a multilayer coextrusion composite with a desired overall and individual layer distribution has been produced. Such a coextrusion adapter is often also called a "feedblock".

The term "central channel" in the present context denotes a channel arranged within a coextrusion adapter for producing the central layer of a multilayer coextrusion composite.

In contrast, the term "coextrusion channel" denotes a secondary channel within the coextrusion adapter for producing an additional layer of a multilayer coextrusion composite, which is arranged adjacent to the central layer.

The term "adjusting elements" describes in the sense of the invention any devices by means of which channel cross-sections of material-carrying channels (central channel and/or coextrusion channels) of a coextrusion adapter can be manipulated. Usually, the adjusting elements are arranged within the coextrusion adapter and at least partially within a channel of the coextrusion adapter.

For example, such an adjusting element can be designed as a sliding element which can be inserted transversely into a material-carrying channel, to name just one possibility here. Alternatively, such an adjusting element can be pivoted about an axis of rotation within a material-conducting channel.

Especially by means of a plurality of adjusting elements assigned to a channel, it is possible to act very individually on channel cross-sections of a channel present at a coextrusion channel, be it with regard to the width and/or to the height of the respective channel, whereby profiled individual layers can also be produced.

In this regard, such adjusting elements are often also referred to as "profilers".

For example, a plurality of adjusting elements or profilers are arranged over a total width of a channel in the coextrusion adapter, for example 3 to 10 or more of such adjusting elements, whereby individually profiled single layers can be produced on the coextrusion composite.

The term "adjusting device" describes devices by means of which an adjusting element arranged in the coextrusion adapter can be actuated from outside the coextrusion adapter. As a rule, such an adjusting device comprises for this purpose an adjusting element which is rotatably mounted in a partially threaded bore and has a receptacle for a tool at its outer drive-side end. In addition, the adjusting device usually comprises a measuring pin with markings, which can be used to determine how far an adjusting element projects into an associated channel or which channel cross-section is finally set for the channel. Alternatively, the existing channel cross-section can also be measured on the basis of a distance of an index pin relative to a reference plane or reference surface. If necessary, additional measuring tools or measuring devices are used in this case.

According to a second aspect of the invention, the present problem is solved by an apparatus for producing a coextruded multilayer film comprising at least one extruder device for providing material melts of thermoplastic materials, with an apparatus comprising a coextrusion adapter and a nozzle part for coextruding a multilayer coextruded composite of interconnected individual layers, said coextrusion adapter comprising a central channel for producing a central layer of said coextrusion composite, at least one coextrusion channel for producing at least one other layer of said coextrusion composite interacting with said central layer, a plurality of displaceable adjusting elements for adjusting layer thicknesses and/or layer thickness profiles of individual layers of the coextrusion composite, and adjusting devices for actuating the adjusting elements, with a drive unit for driving the adjusting devices, with a measuring device for measuring layer thicknesses and/or layer thickness profiles of individual layers of the multilayer coextrusion composite, and with a system controller for controlling the system, the system controller comprising a controller unit which is set up so that relative positions of adjusting elements can be set automatically as a function of formulations for thermoplastic materials read in and/or stored in the system for individual layers of a coextruded multilayer film.

The present system can also be operated very effectively if settings can be made automatically in the system by means of stored recipes for thermoplastic materials for individual layers of a coextruded multilayer film.

In particular, the controller unit can be used to manipulate the extruder equipment of the line as a function of the measurement data available from the measuring device located downstream of the nozzle part and/or as a function of the formulations.

According to a third aspect of the invention, the present problem is solved by a plant for producing a coextruded multilayer film with at least one extruder device for providing material melts of thermoplastic materials, with a device comprising a coextrusion adapter and a nozzle part for coextruding a multilayer coextruded composite of interconnected individual layers, said coextrusion adapter comprising a central channel for producing a central layer of said coextrusion composite, at least one coextrusion channel for producing at least one other layer of said coextrusion composite interacting with said central layer, a plurality of displaceable adjusting elements for adjusting layer thicknesses and/or layer thickness profiles on individual layers of the coextrusion composite, and adjusting devices for actuating the adjusting elements, with a drive unit for driving the adjusting devices, with a measuring device for measuring layer thicknesses and/or layer thickness profiles on individual layers of the multilayer coextrusion composite, and with a system controller for controlling the system, the system comprising an output unit which is set up to visualize relative positions of adjusting elements and/or extrusion channel cross-sections within the coextrusion adapter, in particular within an extrusion channel of the coextrusion adapter, and/or channel cross-sections within the coextrusion adapter, in particular by means of a graphical model.

By means of the proposed visualization or graphical representation, existing settings can be visually detected more quickly by a plant operator; in particular errors or misalignments are detected more quickly, whereby the plant can be operated more effectively overall.

In particular, designated settings or setting sequences can be simulated on a coextrusion adapter and cumulatively displayed to a system operator on the output unit in an optically advantageous manner.

Here, the output unit can be realized by a stationary or preferably mobile display device or the like.

At this point, it should also be mentioned that it is advantageous if the system comprises a controller unit which is set up so that the drive unit, in particular actuators thereof, and/or in particular adjustment devices and/or channel cross-sections of channels of the coextrusion adapter and/or ultimately also individual layer thicknesses and/or individual layer thickness profiles of a coextrusion composite or a multilayer film can be manipulated automatically as a function of one or more of the features explained above.

It is also useful if the system has an input unit which is set up to program, in particular, layer thicknesses and/or layer thickness profiles, and/or combinations thereof.

For example, such an input unit can be a display device or a data interface.

A preferred embodiment, which is incidentally also advantageous independently of the other features of the invention, provides for the system to comprise a memory device for storing data relating to formulations for thermoplastic materials for individual layers, the memory device having a memory data interface to the system controller. This makes it possible to store any number of formulations in the system and ideally to combine them with settings, in particular of adjusting elements of the coextrusion adapter.

In this regard, it is advantageous if the system has a memory device for storing data relating to relative positions of adjusting elements in relation to formulations for thermoplastic materials for respective individual layers.

In this context, it is advantageous if the system has a memory device for storing data relating to layer thickness settings as a function of an associated coextrusion composite.

A further advantageous embodiment provides for the plant control system to have electrical data interfaces, in particular electronic or digital data interfaces, for communicating with the present controller units and/or memory devices, in particular also in relation to provided operating data of other plants. In this way, data already obtained from other manufacturing processes can be automatically used for the current setting of the plant.

Furthermore, it is useful if the plant comprises a device according to one of the features disclosed herein.

According to a fourth aspect, the task of the invention is fulfilled by an apparatus for coextruding a multilayer coextrusion composite of interconnected individual layers of thermoplastic materials, in particular a coextruded multilayer film, having a coextrusion adapter which has a central channel for producing a central layer of the coextrusion composite, at least one coextrusion channel for producing at least one other layer of the coextrusion composite which interacts with the central layer, a plurality of displaceable adjusting elements for adjusting layer thicknesses or layer thickness profiles in the individual layers of the coextrusion composite, and adjusting devices for actuating the adjusting elements, and with a nozzle part through which the multilayer coextrusion composite is discharged, wherein a measuring device for automatically measuring layer thicknesses or layer thickness profiles of the multilayer coextrusion composite is arranged downstream of the nozzle part, and wherein the device is set up to automatically manipulate the number of displaceable adjusting elements by means of measurement data obtained from the measuring device.

By measuring layer thicknesses or layer thickness profiles of individual layers downstream of the nozzle part, achieved layer thicknesses or layer thickness profiles can be determined with particular precision, whereby measurement data which are also more precise resulting from this process can be used to adjust the adjusting elements in the coextrusion adapter more quickly and more precisely as a function of this measurement data. In particular, further calculation steps or the like for calculating shrinkage of the layer thicknesses or related profiles due to further cooling or the like can preferably be dispensed with entirely, which not only leads to faster adjustment of adjusting elements.

Hereby, the device according to the invention can carry out a layer thickness change or profiling on the coextrusion adapter with significantly reduced effort.

According to a fifth aspect, the task of the invention is fulfilled by a device for coextruding a multilayer coextrusion composite of interconnected individual layers of thermoplastic materials, in particular a coextruded multilayer film, having a coextrusion adapter which has a central channel for producing a central layer of the coextrusion composite, at least one coextrusion channel for producing at least one other layer of the coextrusion composite which interacts with the central layer, a plurality of displaceable adjusting elements for adjusting the layer thicknesses or layer thickness profiles of the individual layers of the coextrusion composite and adjusting devices for actuating the adjusting elements, and with a nozzle part through which the multilayer coextrusion composite is discharged, the device having one or more actuators arranged at a distance from the coextrusion adapter for automatically driving the adjusting devices, the actuators being operatively connected to the adjusting devices permanently or only temporarily.

If the device has one or more actuators arranged at a distance from the coextrusion adapter, by means of which the adjusting devices can be driven automatically, in particular as a function of determined and/or stored data, the actuators are on the one hand better protected from critical heat influences on the coextrusion device. On the other hand, a large number of actuators can be combined much more compactly to form a drive unit if they are arranged at a distance from the coextrusion adapter.

If the actuators are spaced from but permanently connected to the adjusting devices, the actuators can interact with the adjusting devices without delay, for example in the sense of a permanent direct drive, possibly with the interposition of a gear or the like.

If, on the other hand, the actuators are only temporarily operatively connected to the adjustment devices, the actuators can be placed without any problems in a standby position at an even greater distance from the adjusting devices when not in use, so that they can be advantageously removed from a permanent thermal load. In this case, for example, single actuators are moved in succession to the adjusting devices as required, or several actuators are temporarily operatively connected to the adjusting devices.

The term "distance" here describes a temporarily created gap between the adjusting devices or the coextrusion adapter and the actuators, in particular between a solid block of the coextrusion adapter provided with channels and the actuators.

It is advantageous if there is a distance of more than 50 mm, preferably more than 100 mm or more than 200 mm, between an actuator and the coextrusion adapter, either permanently or temporarily. This not only provides good heat protection for the actuators, but also opens up new design possibilities, particularly with regard to the coextrusion adapter or the drive unit. For example, functional parts of the adjusting devices that transmit forces and/or torque can be arranged structurally closer together on the coextrusion adapter, whereby the latter can be provided more compactly.

To ensure that the coextrusion device does not have an overly projecting overall design despite the proposed spaced actuators, the spacing described above is preferably less than 500 mm or less than 400 mm.

In this context, it is advantageous if directly adjacent adjusting devices are arranged spaced apart from one another on the coextrusion adapter with a component spacing of less than 100 mm, preferably of less than 70 mm and particularly preferably of less than 50 mm.

In particular, it is advantageous if rigid bar elements of the adjusting devices are arranged spaced apart from each other on the coextrusion adapter by a distance of less than 100 mm, preferably of less than 70 mm and particularly preferably of less than 50 mm.

The component spacing is defined here as the orthogonally extending distance between two components or component groups of directly adjacent adjusting devices, which are arranged within the coaxial adapter.

Furthermore, it is particularly useful if a flexible bridging element, in particular a flexible heat bridging element, is arranged between an adjusting device and an actuator, in particular between an input-side drive element of an adjusting device and an output-side output element of an actuator.

As a rule, the adjusting devices installed on a coextrusion adapter comprise rigidly designed rod elements as input-side drive elements. It is also common in the state of the art to use rigidly designed rod elements as output-side drive elements of actuators.

In this case, the relevant drive and output elements lie on a common spatial axis or axis of rotation, so that in known coextrusion adapters distances between adjusting devices on the one hand and between actuators on the other hand are mutually dependent.

Often, output-side output elements and input-side input elements are even designed as one common component.

By means of the interposition of flexible bridging elements, spatial arrangement constraints between adjusting devices and actuators are largely eliminated and further advantageous arrangement options are provided.

The flexible bridging element is to be regarded as a kind of cardan device and can be designed in various ways, for example as an articulated part with one or more joints. Alternatively, the flexible bridging element can be designed as a flexible shaft with a flexible base body.

The term "heat bridging element" describes again more clearly that by means of the spacing according to the invention, in particular also a heat protection for the actuators is achieved.

It has proved advantageous if an input-side drive element of an adjusting device and an output-side output element of an actuator have different axes of rotation, the axes of rotation being arranged offset from one another.

If the corresponding drive and output elements have different alignments, further advantageous design options are opened up for implementing a coextrusion adapter. For example, the drive and the output elements are arranged at an angle to each other with a common point of intersection. It is also conceivable that they are arranged parallel to each other.

In any case, the present flexible bridging element provides a particularly good bridging capability for a gap (distance) between an adjustment mechanism installed on the coextrusion adapter and an actuator interacting therewith, with simultaneous heat decoupling.

It is also advantageous if input-side drive elements of an adjustment device are arranged closer together than output-side output elements of an actuator, since this allows in particular the coextrusion adapter to be constructed to be more compact.

If several actuators are combined to form a drive unit, in particular an actuator package, the present coextrusion device and in particular its coextrusion adapter can be built to be more compact.

An alternative embodiment provides for at least one manipulator with one or more actuators to be present, by means of which at least one actuator can be brought temporarily into operative contact with the adjusting devices of the coextrusion adapter or by means of which at least one actuator can be temporarily spaced apart from the adjusting devices of the coextrusion adapter.

Furthermore, it is particularly advantageous if the present drive unit can be manipulated in an automated manner as a function of a measured layer thickness and/or a measured layer thickness profile, of a calculated layer thickness and/or a calculated layer thickness profile and/or a designated layer thickness and/or a designated layer thickness profile. Hereby, an adjustment of cross-sections of material melt channels arranged in the coextrusion adapter can be achieved in a particularly advantageous manner.

Cumulatively or alternatively, it is advantageous if the drive unit can be manipulated in an automated manner as a function of a predicted layer thickness and/or a predicted layer thickness profile.

Furthermore, it should be noted that, for the purposes of the invention, the terms "control" and "regulation" and, to that extent, also "controlling" and "regulating" are used synonymously, unless expressly defined otherwise. Consequently, the plant control device also relates to a plant regulating device.

According to a sixth aspect, the task of the invention is also solved by a method for coextruding a multilayer coextrusion composite for a multilayer film comprising a plurality of individual layers, in which layer thicknesses and/or layer thickness profiles of individual layers of the multilayer film are measured after they emerge from a nozzle part of a coextrusion device, and in which measurement data are generated accordingly, and in which layer thicknesses and/or layer thickness profiles of the multilayer coextrusion composite upstream of the nozzle part are corrected, in particular corrected inline, as a function of these measurement data. Thickness measurements downstream of the nozzle part provide much more accurate measurement data on the actual layer thicknesses and/or layer thickness profiles of the end product. Therefore, the coextrusion device can be adjusted more quickly and accurately by means of these measurement data. Hereby, the method can be carried out more effectively.

According to a seventh aspect, the task of the invention is further solved by a method for coextruding a multilayer coextrusion composite for a multilayer film consisting of several individual layers, in which layer thicknesses and/or layer thickness profiles of individual layers of the multilayer film are measured after they emerge from a nozzle part of a coextrusion device, and in which measurement data are generated accordingly, and in which adjusting elements for adjusting coextrusion channels of the coextrusion device are manipulated, in particular manipulated inline, as a function of these measurement data. Thickness measurements downstream of the nozzle part provide much more accurate measurement data on the actual layer thicknesses or layer thickness profiles of the end product. In this regard, the adjusting elements of the coextrusion device can be set more quickly and accurately by means of this measurement data. As a result, the process can be carried out more effectively.

According to an eighth aspect, the task of the invention is further solved by a method for coextruding a multilayer coextrusion composite for a multilayer film comprising a plurality of individual layers, in which layer thicknesses and/or layer thickness profiles in the multilayer coextrusion composite are manipulated by means of adjusting elements for adjusting coextrusion channels of the coextrusion device, wherein relative positions of adjusting elements within the coextrusion channels are manipulated as a function of formulations for thermoplastic materials for individual layers stored in a system controller. This also allows the process to be carried out more effectively.

According to a ninth aspect, the task of the invention is further solved by a method for coextruding a multilayer coextrusion composite for a multilayer film comprising a plurality of individual layers, wherein layer thicknesses and/or layer thickness profiles in the multilayer coextrusion composite are manipulated by means of adjusting elements for adjusting coextrusion channels of the coextrusion device, and in which relative positions of adjusting elements within the coextrusion channels, in particular absolute gaps of extrusion channel cross-sections, are optically displayed on an optical output unit, in particular by means of a graphic model of the coextrusion device. Hereby, settings can intuitively and thus more quickly be grasped by operating personnel, so that the method can be carried out more effectively.

According to a tenth aspect, the task of the invention is further solved by a method for coextruding a multilayer coextrusion composite for a multilayer film comprising a plurality of individual layers, in which layer thicknesses and/or layer thickness profiles in the multilayer coextrusion composite are manipulated by means of adjusting elements for adjusting coextrusion channels of the coextrusion device, and in which simulations of relative positions of adjusting elements within the coextrusion channels are optically displayed on an optical output unit, in particular by means of a graphical model of the coextrusion device. In this way, settings can intuitively and thus more quickly be grasped by operators, so that the method can be carried out more effectively.

According to an eleventh aspect, the task of the invention is further solved by a method for operating a plant for producing a coextruded multilayer film, in particular the present plant according to one of the features described herein, and/or a device for coextruding a multilayer coextruded composite, in particular the present device according to one of the features described herein, using one of the methods explained above. Hereby, the corresponding plant or apparatus can be operated more effectively.

A further process variant in which settings for optimizing a method for coextrusion and/or a method for operating the plant are automatically made and/or automatically suggested for selection by means of automatic data analysis is particularly advantageous. In particular, settings can be made automatically on the present adjusting elements, settings on actuators, settings on extruders, or the like, or suggested to a plant operator, whereby the production of coextruded multilayer films can be realized even more efficiently.

At this point it is also claimed that the described processes can also be supplemented by further technical features described here, in particular by features of a plant and/or an apparatus, in order to advantageously further develop the methods or to be able to present or formulate method specifications even more precisely.

Furthermore, it is also advantageous if the system is characterized by digital single-layer adjustment possibilities with an absolute gap measurement and/or digital data acquisition and/or digital data collection and/or digital evaluation.

By means of the present invention, the burden on plant operators can be advantageously reduced. As a rule, a plant operator must have many years of experience and very great basic knowledge in order to be able to perform the necessary settings so that a coextrusion plant, in particular a coextrusion adapter, can be set up sufficiently well.

It is understood that features of the solutions described above or in the claims can also be combined, if necessary, in order to be able to implement the advantages and effects achievable in the present case in a correspondingly cumulative manner.

Further features, effects and advantages of the present invention are explained with reference to the attached drawing and the following description, in which a system for the production of a coextruded multilayer film and system components thereof are illustrated and described by way of example.

BRIEF DESCRIPTION OF THE DRAWINGS

Components, which in the individual figures at least substantially correspond in terms of function, can be marked here with the same reference numbers, whereby the components do not have to be numbered and explained in all figures.

The drawings show as follows.

Figure 1:
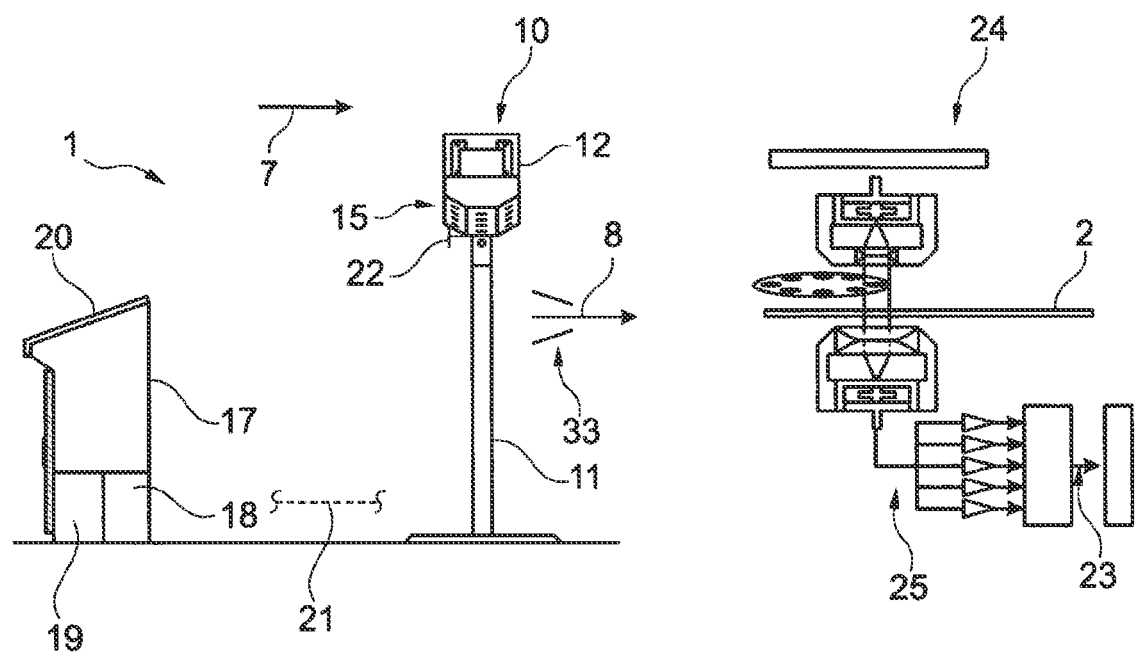
FIG. 1 schematically shows a reduced partial view of a system for producing a coextruded multilayer film with a coextrusion device essentially comprising a coextrusion adapter and a nozzle part, with a measuring device arranged downstream of the nozzle part, with a drive unit for the coextrusion adapter, with a system controller comprising an output unit and with a controller unit.
Figure 2:
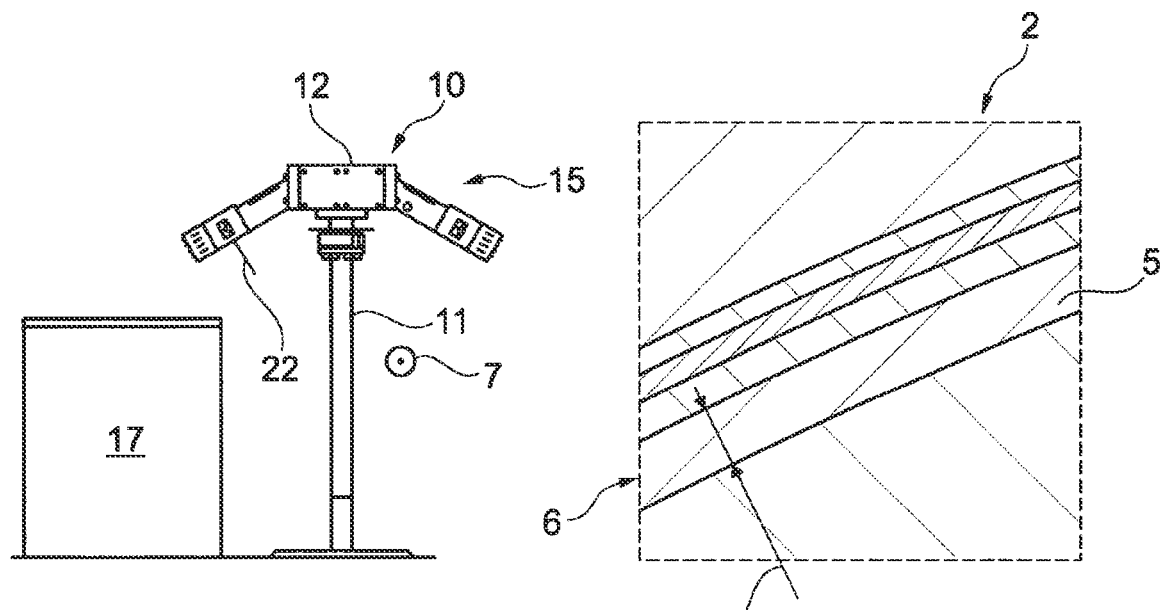
FIG. 2 schematically shows of a further partial view of the system shown in FIG. 1.
Figures 4, 5:
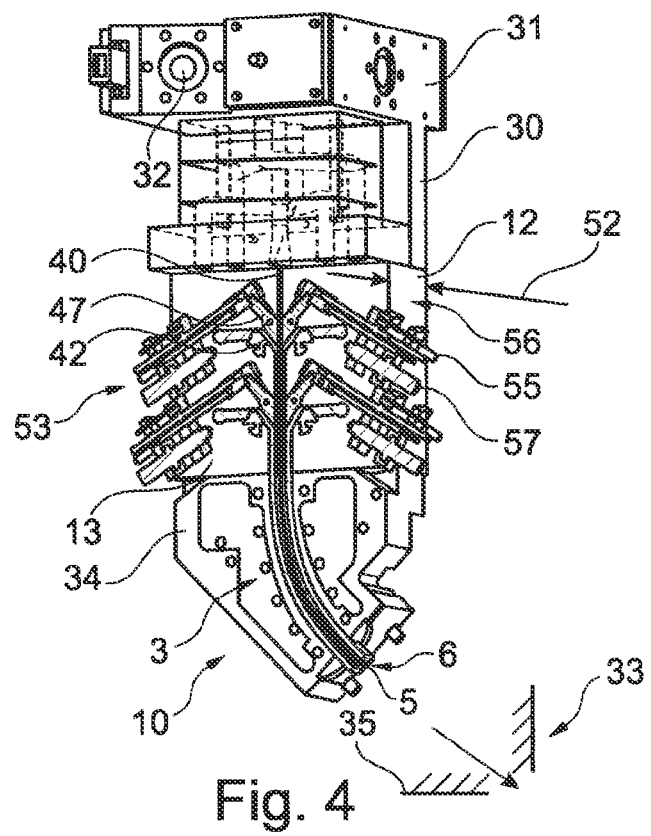
FIG. 4 schematically shows a sectional view of the coextrusion adapter of the line shown in FIGS. 1 and 2.
FIG. 5 schematically shows a partial perspective view of the coextrusion adapter shown in FIG. 4 with the drive unit partially shown flanged thereto.

The system 1 shown in particular in FIGS. 1 and 2 as a first possible embodiment is set up for producing a coextruded multilayer film 2, which is produced from a multilayer coextrusion composite 3 (cf. for example FIG. 4).

Figure 3:
FIG. 3 schematically shows a sectional view through a coextruded multilayer film produced by means of the system shown in FIGS. 1 and 2, with a central layer and three further layers extruded thereon.

While the coextruded multilayer film 2 shown by way of example in FIGS. 1 and 3 consists of an extruded central layer 5 and three further coextruded layers 6, the multilayer coextruded composite 3 shown by way of example in FIG. 4 shows an extruded central layer 5 with a total of four additional coextruded layers 6.

The line 1 has a machine direction 7 in which the multilayer coextrusion composite 3 or the coextruded multilayer film 2 is conveyed along a processing section 8 through the line 1.

According to the illustrations according to FIGS. 1 and 2, in particular a coextrusion device 10 for coextruding the multilayer coextrusion composite 3 with a frame 11, on which a coextrusion adapter 12 with its block base body 13 is arranged, a drive unit 15, a system controller 17, which in particular comprises a controller unit 18, a memory unit 19, an output unit 20 as well as a digital network connection 21, which has a plurality of digital interfaces 22, 23 (only shown and referenced by way of example) for a data connection of all data-processing-relevant system components (not referenced again), and a measuring device 24, the latter being equipped in this embodiment with an infrared apparatus 25, are shown.

In particular in the representation according to FIG. 4, the coextrusion device 10 is shown more clearly with the coextrusion adapter 12, to which a channel package part 30 with a distributor plate 31 attached thereto is fixed on the head side for flanging on extruder devices not shown here, in order to melt different materials 32 (only numbered by way of example). On the base side of the coextrusion adapter 12, a nozzle part 33 is attached, which is flanged to the coextrusion adapter 12 by means of a nozzle connection flange 34 for supporting the nozzle part 33. The nozzle part 33 is configured as a slot die 35.

In any case, the measuring device 24 already mentioned above is arranged in particular downstream of the slot die or the nozzle part 33, as viewed in the machine direction, that is to say downstream of this nozzle part 33.

The coextrusion adapter 12 shown here by way of example has a central channel 40 for producing the central layer 5 of the multilayer coextrusion composite 3 and a total of four further coextrusion channels 42 (numbered only by way of example) for producing four further layers 6 of the coextrusion composite 3, namely two further layers 6 lying further inwards, which interact directly with the central layer 5, and two further layers 6 lying further outwards, which interact or are connected indirectly with the central layer 5 via the additional layers 6 lying further inwards.

Furthermore, the coextrusion adapter 12 has a plurality of adjusting elements 47 (numbered only by way of example) by means of which not only different layer thicknesses 50 (see FIG. 3) but also different layer thickness profiles (not shown) can be individually set over the width of the multilayer coextrusion composite 3. Since such adjusting elements 47 are already known from the prior art, they are not described in more detail here. In any case, several such adjusting elements 47 per channel 40 or 42 are arranged next to each other in the direction 52 of width of the coextrusion adapter 12, so that in particular in this embodiment with regard to the four further coextrusion channels 42 not only their channel cross-sections (not separately numbered) and thus also layer thicknesses 50 as a whole can be individually manipulated, but in addition also channel cross-section profiles (not shown) and consequently also layer thickness profiles can be individually set.

For actuating the adjusting elements 47 located deep in the coextrusion adapter 12, the coextrusion adapter 12 also has a corresponding number of adjusting devices 53, which project with their input-side drive elements 55 beyond the outside 56 of the coextrusion adapter 12 or are at least accessible from the outside, so that the drive unit 15 can drive the adjusting devices 53, whereby ultimately the adjusting elements 47 can in turn be actuated by the drive unit 15. The adjusting devices 53 also have index pin elements 57, by means of which the relative positions (not numbered) of the adjusting elements 47 arranged in the coextrusion adapter 12 can be determined and checked. For this purpose, the index pin elements 57 and the respective input-side drive elements 55 associated with them are fixedly connected to one another, so that each movement of an input-side drive element 55 is synchronized with the movement of the associated index pin element 57.

In this case, the respective relative position of an adjusting element 47 is determined by means of an index dimension $X_1$, $X_2$ or $X_3$ (cf. FIG. 6) drawn in by way of example, wherein such an index dimension $X_1$, $X_2$ or $X_3$ can be measured, for example, in relation to a reference surface (not separately numbered), for example the outer face 56 of the coextrusion adapter 12. Alternatively, such a measurement can also be carried out by means of an eddy current sensor, an inductive, capacitive or optical distance or path sensor, a measuring probe or the like.

According to the illustration in FIG. 5, the coextrusion adapter 12 and the drive unit 15 are shown at least partially without a housing, and it can be clearly seen that a plurality of actuators 58 (numbered only by way of example) are on the one hand combined very closely together to form an actuator package 59 and on the other hand are arranged at a distance 62 from the coextrusion adapter 13 or its block base body 13 by means of a heat shield device 60. Thus, the individual actuators 58 are better protected from heat emanating from the coextrusion adapter 13 not only by the gap 63 resulting from the distance 62, but also by a heat shield 64 of the heat shield device 60, wherein, in the sense of the invention, a simple metal sheet is already considered to be heat shield 64.

In order to be able to bridge the gap 63 between the actuators 58 or, in particular, their output-side drive elements 65 and the input-side drive elements 55 of the adjusting devices 53 in terms of drive technology, a bridging element 66 in the form of a flexible cardan shaft 67 is arranged in each case between each output-side drive element 65 of an actuator 58 and each input-side drive element 55 of an associated adjusting device 53.

This means that such a flexibly designed bridging element 66 can also be used to compensate for an offset between an output-side drive element 65 of an actuator 58 and an associated input-side drive element 55 of an adjusting device 53.

In this respect, the output elements 65 on the output side and an associated drive element 55 on the input side can have different or offset axes of rotation (not referenced), whereby it is possible, in particular, to arrange the input side drive elements 55 closer together than can be the case with the output drive elements 65 of the actuators 58 due to the dimensions of the actuators 58.

Figure 6:
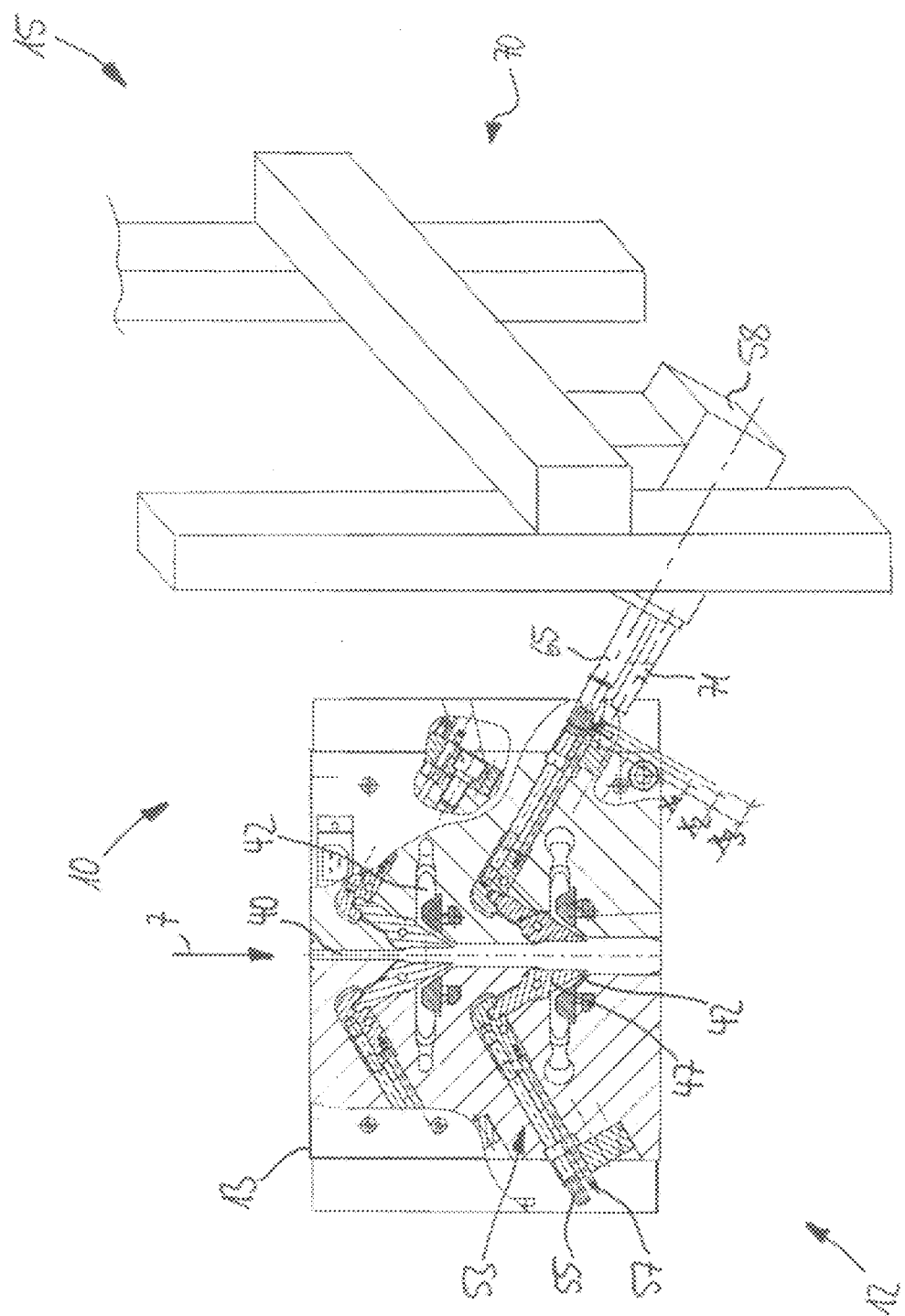
FIG. 6 schematically shows a representation of an alternative coextrusion adapter and an alternative drive unit with a manipulator.

According to the illustration in FIG. 6, another alternative embodiment of a different coextrusion adapter 12 in combination with a different drive unit 15 for the system 1 for producing a coextruded multilayer film 2 or for its device 10 for coextruding a multilayer coextrusion composite 3 is shown, whereby in the following only the differences to the first embodiment shown in FIGS. 1 to 5 are described in order to avoid repetitions. While the other coextrusion adapter 12 of FIG. 6 is essentially identical in construction with the coextrusion adapter 12 of the first embodiment, the other drive unit 15 of FIG. 6 differs by having a manipulator 70, on which a single actuator 58 is arranged.

By means of the manipulator 70, each individual actuator 58 can be moved spatially in such a way that each adjusting device 53 on the same side of the coextrusion adapter 12 can be approached individually one after the other.

For this purpose, the output element 65 of the actuator 58 on the output side is in each case brought into operative contact with the drive element 55 on the input side, so that the respective adjusting device 53 is driven, and thus the associated adjusting element 47 can be manipulated accordingly with regard to its relative position on or in the respective extrusion channel 5, 6.

In this case, the respective associated index pin element 57 is also displaced accordingly. With a sensor device 71 additionally arranged on the actuator 58, the respective index dimension $X_1$, $X_2$ or $X_3$ can be determined, with which the relative position of the respective adjusting element 47 can be determined. In this alternative example of embodiment, the sensor device 71 has a laser displacement sensor. However, confocal displacement measurements with optical sensors or laser sensors for 2D and/or 3D measurements are also possible.

At this point, it should be explicitly pointed out that features of the solutions described above or in the claims and/or figures can also be combined, if necessary, in order to be able to implement or achieve the explained features, effects and advantages in a correspondingly cumulative manner.

It is understood that the embodiments explained above are merely first embodiments of the invention. Consequently, the implementation of the invention is not limited to these embodiments.

All features disclosed in the application documents are claimed to be essential to the invention insofar as they are new, individually or in combination, compared to the prior art.

LIST OF REFERENCE SIGNS USED 1 system
2 coextruded multilayer film
3 multilayer coextrusion composite
5 extruded central layer
6 further coextruded layers
7 machine direction
8 processing section
10 coextrusion device
11 frame
12 coextrusion adapter
13 block base body
15 drive unit
17 system controller
18 controller unit
19 storage unit
20 output unit
21 network connection
22 digital interface of the drive unit
23 digital interface of the measuring unit
24 measuring unit
25 infrared apparatus
30 channel package part
31 distributor plate
32 material melts
33 nozzle part
34 nozzle connection flange
35 slot die
40 central channel
42 other coextrusion channels
47 adjusting elements
50 layer thicknesses
52 width direction
53 adjusting elements
55 input-side drive elements
56 outer face
57 index pin elements
58 actuators
59 actuator package
60 heat shield device
62 distance 63 gap
64 heat shield
65 output-side output elements
66 bridging element
67 flexible cardan shaft
70 manipulator
71 sensor device
$X_1$ first index dimension
$X_2$ second index dimension
$X_3$ third index dimension

The invention claimed is:

1. Apparatus (10) for coextruding a multilayer coextrusion composite (3) comprising:
   interconnected individual layers (5, 6) of thermoplastic materials, having a coextrusion adapter (12) which has a central channel (40) for producing a central layer (5) of the coextrusion composite (3), at least one coextrusion channel (42) for producing at least one further layer (6) of the coextrusion composite (3) interacting with the central layer (5),
   a plurality of displaceable adjusting elements (47), each comprising a rotatable member mounted in a threaded bore, for adjusting layer thicknesses (50) or layer thickness profiles of the individual layers (5, 6) of the coextrusion composite (3) and
   adjusting devices (53), each comprising a drive-side engagement structure (55) configured to receive a tool for actuating the adjusting elements (47), and with a nozzle part (33) through which the multilayer coextrusion composite (3) is discharged,
   wherein a measuring device (24), positioned downstream of the nozzle part (33), configured to automatically measure the layer thicknesses (50) or the layer thickness profiles of the multilayer coextrusion composite (3) is arranged downstream of the nozzle part (33),
   wherein the apparatus (10) being set up to manipulate the plurality of displaceable adjusting elements (47) automatically by means of measurement data obtained from the measuring device (24),
   wherein the apparatus further includes an actuator (58) being located at a distance (62) of more than 50 mm from the coextrusion adapter (12), and
   wherein a flexible, thermally conductive coupling element (66) is arranged between an input-side drive element (55) of an adjusting device (53) and an output-side output element (65) of the actuator (58).

2. Device (10) according to claim 1, wherein the input-side drive element (55) of the adjusting device (53) and the output-side output element (65) of the actuator (58) have different axes of rotation, the axes of rotation being arranged offset from one another.

3. Device (10) according to claim 1, wherein a plurality of actuators (58) are combined to form a drive unit (15).

4. Device (10) according to claim 1 further comprising at least one manipulator, wherein the actuator (58) is arranged on the at least one manipulator and can be brought temporarily in operative contact with the adjusting devices (53) of the coextrusion adapter (12) or can be temporarily spaced apart from the adjusting devices (53) of the coextrusion adapter (12).

5. The apparatus of claim 1, wherein the thermally conductive coupling element (66) is comprised of a flexible heat bridging element.

* * * * *